(12) United States Patent
Liepold

(10) Patent No.: US 11,982,274 B2
(45) Date of Patent: May 14, 2024

(54) ELECTRICAL COOLANT DRIVE

(71) Applicant: Brose Fahrzeugteile SE & Co. Kommanditgesellschaft, Würzburg, Würzburg (DE)

(72) Inventor: Christopher Liepold, Rimpar (DE)

(73) Assignee: Brose Fahrzeugteile SE & Co. Kommanditgesellschaft, Würzburg (DE)

( * ) Notice: Subject to any disclaimer, the term of this patent is extended or adjusted under 35 U.S.C. 154(b) by 369 days.

(21) Appl. No.: 17/428,668

(22) PCT Filed: Feb. 5, 2020

(86) PCT No.: PCT/EP2020/052800
§ 371 (c)(1),
(2) Date: Aug. 5, 2021

(87) PCT Pub. No.: WO2020/161156
PCT Pub. Date: Aug. 13, 2020

(65) Prior Publication Data
US 2022/0118825 A1    Apr. 21, 2022

(30) Foreign Application Priority Data
Feb. 7, 2019 (DE) ............ 10 2019 201 614.6

(51) Int. Cl.
*F04C 23/00* (2006.01)
*F04B 39/12* (2006.01)
(Continued)

(52) U.S. Cl.
CPC .......... *F04C 23/008* (2013.01); *F04B 39/121* (2013.01); *F04C 18/0215* (2013.01);
(Continued)

(58) Field of Classification Search
CPC ............ H01R 13/5205; H01R 13/5202; H01R 13/521; F04B 39/121; F04C 2240/803;
(Continued)

(56) References Cited

U.S. PATENT DOCUMENTS

| 5,791,884 A * | 8/1998 | Iio ..................... F04C 28/28 418/2 |
| 8,113,800 B2 | 2/2012 | Koitabashi et al. |

(Continued)

FOREIGN PATENT DOCUMENTS

| CN | 101155994 A | 4/2008 |
| CN | 101666303 A | 3/2010 |

(Continued)

OTHER PUBLICATIONS

Korean Office Action for Application No. 10-2021-7028483, dated May 19, 2023, English Translation attached to original, All together 10 Pages.

(Continued)

*Primary Examiner* — Peter J Bertheaud
(74) *Attorney, Agent, or Firm* — Dickinson Wright PLLC

(57) ABSTRACT

An electrical coolant drive including a motor housing, which accommodates an electric motor and has a fluid-tight housing intermediate wall forming an electronics housing accommodating a motor electronics system, at least one through-opening is introduced into the housing intermediate wall, via which a phase connection of a stator winding of the electric motor is guided into the electronics housing in a fluid-tight and pressure-tight manner to contact the motor electronics, and a step surrounding the through-opening is introduced into the housing intermediate wall, and a first sealing ring sits in the through-opening, directly in contact with the phase connection.

17 Claims, 4 Drawing Sheets

(51) Int. Cl.
    *F04C 18/02*     (2006.01)
    *H01R 13/52*     (2006.01)
    *H02K 5/10*     (2006.01)
    *H02K 5/22*     (2006.01)
    *B60H 1/32*     (2006.01)

(52) U.S. Cl.
    CPC ..... *H01R 13/5202* (2013.01); *H01R 13/5205* (2013.01); *H01R 13/521* (2013.01); *H02K 5/10* (2013.01); *H02K 5/225* (2013.01); *B60H 1/3222* (2013.01); *B60H 2001/3292* (2013.01); *F04C 2240/803* (2013.01)

(58) Field of Classification Search
    CPC ... F04C 23/008; F04C 18/0215; H02K 5/225; H02K 5/10
    See application file for complete search history.

(56) References Cited

U.S. PATENT DOCUMENTS

| | | |
|---|---|---|
| 8,757,989 B2 | 6/2014 | Murakami |
| 8,841,806 B2 | 9/2014 | Fukasaku et al. |
| 8,956,129 B2 * | 2/2015 | Murakami ............ F04B 39/121 |
| | | 417/410.5 |
| 10,107,293 B2 * | 10/2018 | Kinoshita .............. H02K 5/225 |
| 2008/0138226 A1 | 6/2008 | Koitabashi et al. |

FOREIGN PATENT DOCUMENTS

| | | |
|---|---|---|
| CN | 102738917 A | 10/2012 |
| CN | 107005124 A | 8/2017 |
| DE | 69627760 T2 | 10/2003 |
| DE | 102012205112 A1 | 10/2012 |
| DE | 102015202348 A1 | 6/2016 |
| DE | 102016223576 | 5/2018 |
| DE | 102016223576 A1 | 5/2018 |
| DE | 102017205970 A1 | 10/2018 |
| EP | 2159425 B1 | 10/2015 |
| JP | 2008113488 A | 5/2008 |
| JP | 2009203902 A | 9/2009 |

OTHER PUBLICATIONS

Chinese Office Action for CN 202080011874.0 dated Oct. 24, 2023, Google English Machine Translation attached to original, All together 14 Pages.

* cited by examiner

ELECTRICAL COOLANT DRIVE

CROSS-REFERENCE TO RELATED APPLICATIONS

This application is the U.S. National Phase of PCT Application No. PCT/EP2020/052800 filed on Feb. 5, 2020, which claims priority to German Patent Application No. DE 10 2019 201 614.6, filed on Feb. 7, 2019, the disclosures of which are hereby incorporated in their entirety by reference herein.

TECHNICAL FIELD

The present disclosure relates to an electrical refrigerant drive, such as a refrigerant compressor for an air-conditioning system of a motor vehicle.

BACKGROUND

Motor vehicles are generally fitted with air-conditioning systems which air-condition the vehicle interior with the aid of a system forming a refrigerant circuit. Systems of this kind have, in principle, a circuit in which a refrigerant is guided. The refrigerant, for example R-134a (1,1,1,2-tetrafluoroethane) or R-744 (carbon dioxide), is heated at an evaporator and compressed by means of a (refrigerant) compressor, wherein the refrigerant subsequently releases the absorbed heat again via a heat exchanger before being guided to the evaporator again via a throttle valve.

In applications of this kind, scroll machines (scroll compressors) are often used as compressors for the refrigerant. A scroll compressor has a stationary scroll and a movable (orbiting) scroll driven by means of the electric motor, the spiral wall of the movable scroll engaging into that of the stationary or scroll.

The electric motor is connected to (motor) electronics for the purpose of regulating and/or controlling and for supplying power to the electronics. In order to protect them against environmental influences (soiling, moisture), the motor electronics are accommodated in an electronics housing. The electronics housing is arranged in the vicinity of a motor housing accommodating the electric motor. The electric motor is generally of brushless design having a stator and a rotor rotatably mounted therein. The stator is fitted with a rotating-field or stator winding, typically comprising a number of coils connected in star or in delta. The phase ends of the stator winding are guided from the motor housing to the electronics housing and there are coupled to an inverter of the motor electronics.

For cooling purposes, the refrigerant and/or a motor fluid (motor oil) washes around the electric motor during operation. This requires fluid-tight and pressure-tight separation between the motor housing and the electronics housing, so that the power electronics of the motor electronics is not damaged or destroyed. For this purpose, the phase ends or the lines that are in contact with them and with the electronics are sealed off from the housings. On account of different thermal expansions of the seals used and/or of the housings, there is a risk of leakages during operation of the refrigerant compressor here.

SUMMARY

The present disclosure is based on the object of specifying an electromotively driven refrigerant drive of the kind mentioned at the outset in which the fluid-tight and pressure-tight separation between the motor housing and the electronics housing is improved. As an example, a simplified housing bushing, and also for a coil end designed as an enameled wire, may be provided.

To this end, the electrical (electromotive) refrigerant drive, such as for a refrigerant compressor of an air-conditioning system of a motor vehicle, has an electric motor which is coupled or can be coupled to a compressor. A motor housing which accommodates the electric motor having a stator and a rotor rotatably mounted therein may include a fluid-tight housing intermediate wall so as to form an electronics housing which accommodates motor electronics. At least one passage opening is made in the housing intermediate wall, via which passage opening a phase connection of a stator winding of the stator is guided in a fluid-tight and pressure-tight manner into the electronics housing for making contact with the motor electronics. Here, fluid-tight is intended to be understood to mean, for example, gas-tight sealing from the (gaseous) refrigerant in the motor housing.

Three passage openings of this kind, accordingly typically three phases of the rotating-field winding of the electric motor, are suitably provided. In this case, the coils of the stator or rotating-field seal (for example connected in star or in delta) are interconnected at the stator in the motor housing. However, for example, six passage openings of this kind can also be provided, such as if the coils of the stator or rotating-field seal are interconnected by means of the motor electronics in the electronics housing.

A step surrounding the passage opening is made in the housing intermediate wall, wherein a first sealing ring, which bears directly against the phase connection, sits in the passage opening. The phase connection is advantageously designed as an enameled wire. The phase connection may be formed by a coil end, designed as an enameled wire, of the stator or rotating-field winding. In other words, a coil end of the coils typically wound from an enameled wire is conveniently used directly as a phase connection which is guided via the passage opening in the housing intermediate wall into the electronics compartment (electronics housing) accommodating the motor electronics. As a result, a simple plated through-hole out of the motor compartment (motor housing), via the housing intermediate wall, into the electronics compartment is provided, that may save additional connection bolts or the like.

According to one or more embodiments, the first sealing ring, which sits in the step surrounding the passage opening, bears circumferentially directly against the passage opening. This variant, for example, with direct use of the respective enameled wire coil end as a phase connection, provides a particularly simple, fluid-tight and pressure-tight plated through-hole, which saves costs both in respect of production and also in respect of the number of components used, via the housing intermediate wall between the motor compartment and the electronics compartment.

According to another embodiment, an additional sleeve is provided, which sits in the passage opening and via which the corresponding phase connection with the first sealing ring bearing against it is guided. An annular groove is expediently provided on the outer circumference of the sleeve, in which annular groove a second sealing ring bearing circumferentially against the passage opening sits.

In another embodiment, the sleeve has a first sleeve section and a widened second sleeve section. A circumferential supporting collar is formed between these two sleeve sections, the sleeve bearing against the or a step surrounding the passage opening by way of the supporting collar. Here,_ the annular groove receiving the second sealing ring may be made in the widened, second sleeve section of the sleeve.

Another embodiment provides that the first sealing ring and/or the second sealing ring are/is connected in a materially bonded manner to the sleeve, expediently injection-molded onto the sleeve. Here, the design as a two-component injection-molded part may be suitable. With respect to the shape and the material of the sealing rings, these are designed as an elastomeric seal, such as as an O-ring, or as a solid seal, such as a metal C-ring.

In the case of a design as a C-ring, this bears, for example, with prestress, circumferentially against the metal housing material of the housing intermediate wall within the bushing. The C-ring, which can also be designed with an enclosed sealing pipe, such as a metal seal with an open C-profile as the cross-sectional shape which creates a comparatively large degree of return deformation. This ensures effective sealing off between the motor housing (compartment) and the electronics housing (compartment) over a wide temperature range and over a wide (refrigerant) pressure range.

An exemplary material pair of the sleeve with the first sealing ring and/or the second sealing ring is PA6 (or PA66), that is to say polycaprolactam (Perlon) and HNBR (hydrated acrylonitrile butadiene rubber) with high thermal and chemical resistance.

In one or more embodiments, the bushing is designed as a cylindrical interference fit in the second variant. To this end, the sleeve in the passage opening is pressed by a pressing sleeve. Here, the sleeve section that faces the motor compartment, that is to say faces away from the motor electronics, has a joining contour, such as in the form of at least one encircling, axial oriented annular collar. The annular collar engages (in an interlocking and/or frictional manner) into a joining contour of the pressing sleeve. An annular groove which firstly is concentric with a central sleeve shaft for guiding through the phase connection and secondly is delimited at the outer circumference by a pressing sleeve-side annular collar is suitable for this purpose. The sleeve-side annular collar projects beyond the sleeve shaft of the pressing sleeve axially so as to form a (coaxial) receiving space for the first sealing ring, wherein the outer annular collar of the pressing sleeve is supported on a step (shoulder contour), provided on the outer circumference of the sleeve, as a bearing contour.

The advantages achieved by the present disclosure may be providing a simple and nevertheless adequate sealing off from a refrigerant (or refrigerant/oil mixture) located in the motor compartment is achieved by means of even just one sealing ring which, in the bushing through an intermediate wall separating a motor compartment (motor housing) and an electronics compartment (electronics housing) of an electrical refrigerant compressor drive, bears directly against the phase connection.

An additional sleeve, which is sealed off from the bushing by means of a further sealing ring, leads to further improved sealing off, such as when the sleeve in the passage opening is pressed by means of a pressing sleeve. In this case, when only one single phase connection is guided via the passage opening, and this phase connection is the coil end of a corresponding coil, designed as an enameled wire, of the stator or rotating-field winding of the electric motor. This allows considerable simplification of the bushing in comparison to a concept known from EP 2 159 425 B1 in which three phase connections in the form of contact connections are guided via a common connection base, which is seated in an oval passage opening in a wall of the motor housing and is likewise oval, to an inverter of motor electronics.

BRIEF DESCRIPTION OF THE DRAWINGS

Exemplary embodiments of the invention are explained in more detail below with reference to a drawing, in which, in schematic and simplified illustrations.

Parts and magnitudes which correspond to one another are always provided with the same reference symbols throughout the figures.

DETAILED DESCRIPTION

Figure 1:
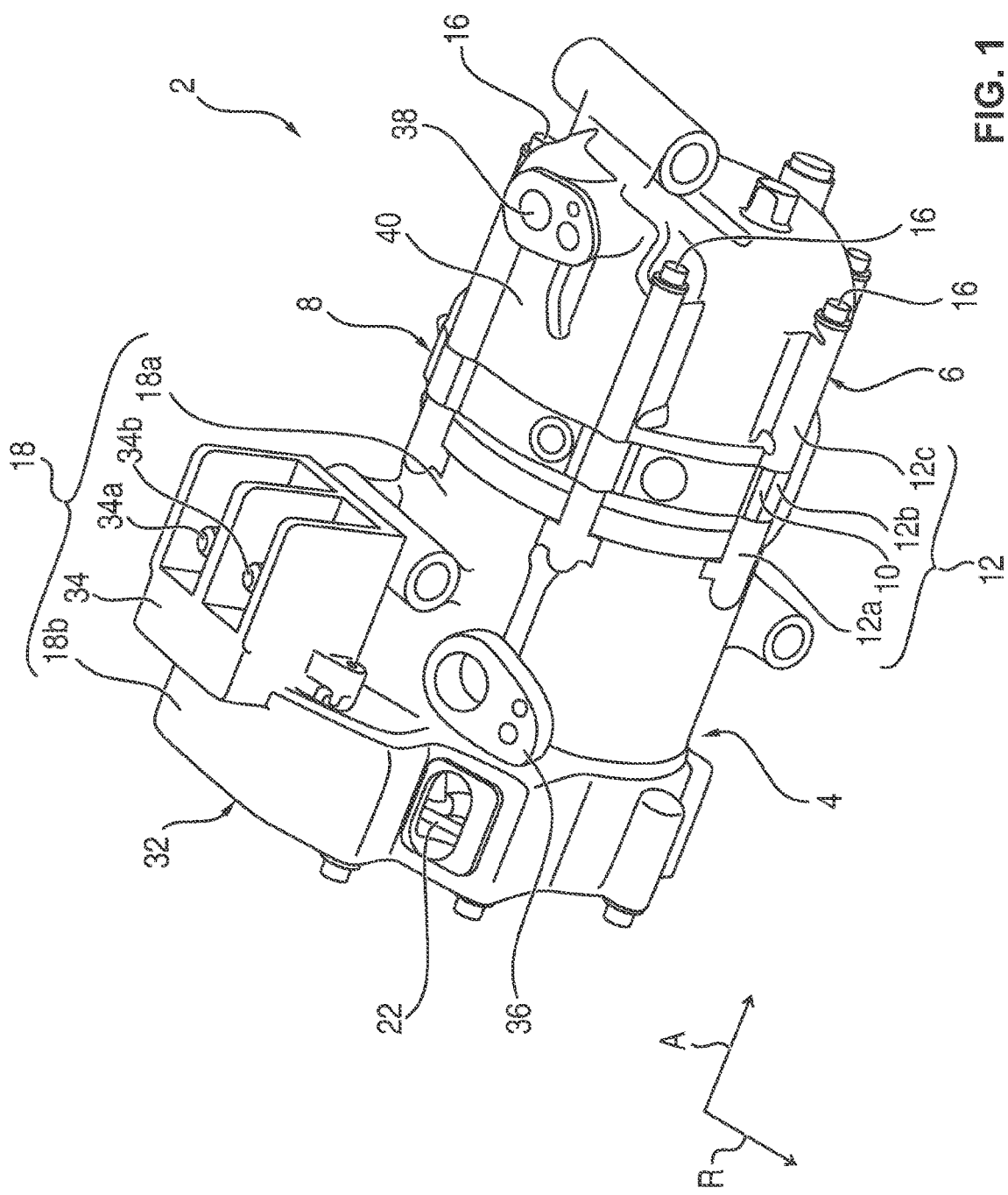
FIG. 1 shows a perspective side view of an electromotive refrigerant compressor having an electromotive drive and having a compressor.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A known electrical (electromotively driven) refrigerant drive known from DE 10 2016 223 576 A1 cited the outset has an electromotive drive having a motor housing in which an electric motor with a rotatable motor shaft is accommodated. The electric motor may include a stator having a stator winding (rotating-field winding) and a rotor rotatably mounted therein and connected in a rotationally fixed manner to the motor shaft. The motor housing is joined on the A-side to an end plate through which the motor shaft partially protrudes to the compressor. The refrigerant compressor designed as a scroll compressor is drive-coupled to that part (A-side shaft end) of the motor shaft projecting beyond the end plate. A fluid-tight and pressure-tight housing intermediate wall is arranged opposite the end plate, an electronics housing being formed as part of the motor housing and being separated from the housing part accommodating the motor components by the housing intermediate wall. The electronics housing accommodates motor electronics controlling and/or regulating the electric motor and is closed or reversibly closable by means of a housing cover. The motor housing and the electronics housing are designed as housing subregions of the drive housing separated from one another by the housing intermediate wall or as separate housing subregions of the drive housing.

A number of passage openings are made in the housing intermediate wall for the purpose of electrically contact-connecting the stator windings of the stator to power electronics (connected in the form a bridge) of the motor electronics. A plated through-hole is inserted into each of the passage openings, the motor housing and the electronics housing being separated in a fluid-tight and pressure-tight manner by the plated through-hole. The respective plated through-hole may include a pin-like connection bolt (phase extension) which is contact-connected to an associated phase end of the stator winding. The passage openings for the phase connections of the rotating-field winding of the electric motor in the housing intermediate wall are sealed off by means of the plated through-holes. The respective connection bolt, which is contact-connected to the associated coil or phase end of the stator winding of the electric motor on the motor side and to a contact element of the motor electronics on the electronics side, is configured as an electrically conductive and mechanical stable line between the phase end and the contact element.

The refrigerant compressor 2 illustrated in FIG. 1 may be installed in a refrigerant circuit, not illustrated in any detail, of an air-conditioning system of a motor vehicle. The electromotive refrigerant compressor 2 has an electrical (electromotive) refrigerant drive 4 and a compressor (compressor head) 6 coupled to the refrigerant drive. The refrigerant drive 4 on the one hand and the compressor 6 on the other are of modular construction, so that, for example, such a refrigerant drive 4 can be coupled to different compressors 6. A transition region formed between the modules of refrigerant drive 4 and compressor 6 has a mechanical interface 8 with a drive-side end plate 10. The compressor 6 is drive-connected to the refrigerant drive 4 via the mechanical interface 8.

For mounting or fastening purposes, the compressor 6 is joined to the refrigerant drive 4 by means of six flange connections 12 distributed over the circumference. Here, the flange connections 12 are integrally formed in a radially projecting manner on the outer circumference of the refrigerant compressor 2 as lug-like flanges 12a, 12b, 12c. Here, the flanges 12a, 12b, 12c each have an axial height along an axial direction A of the coolant compressor 2.

Each flange connection 12 has a flange 12a of the refrigerant drive 4 and a flange 12b of the end plate 10 as well as a flange 12c of the compressor 6, which flanges each have screw receptacles 14 that are in alignment with one another and into each of which a fastening screw 16 can be screwed from the compressor 6. To this end, for example, the screw receptacles 14 of the flange 12a of the refrigerant drive 4 have an internal thread into which the fastening screw 16 can be screwed in a force-fitting manner. The compressor 6 is fastened to the refrigerant drive 4 in an operationally secure manner by way of the resulting six fastening screws 16. In FIG. 1, the flange connections 12 are provided with reference signs merely by way of example.

The refrigerant drive 4 may include a pot-like drive housing 18 with two housing subregions 18a and 18b which are separated from one another in a fluid-tight manner by a monolithically integrated housing intermediate wall 18c within the drive housing 18. The drive housing 18 may be produced as a die-cast part composed of an aluminum material.

The compressor-side housing subregion is designed as a motor housing (motor compartment) 18a for accommodating an electric motor 20. The motor housing 18a is closed on one side by the (housing) intermediate wall 18c and on the other side by the end plate 10. The opposite housing subregion on the intermediate wall 18c is designed as an electronics housing (electronics compartment) 18b in which motor electronics 22 driving the electric motor 20 are accommodated.

Figure 2:
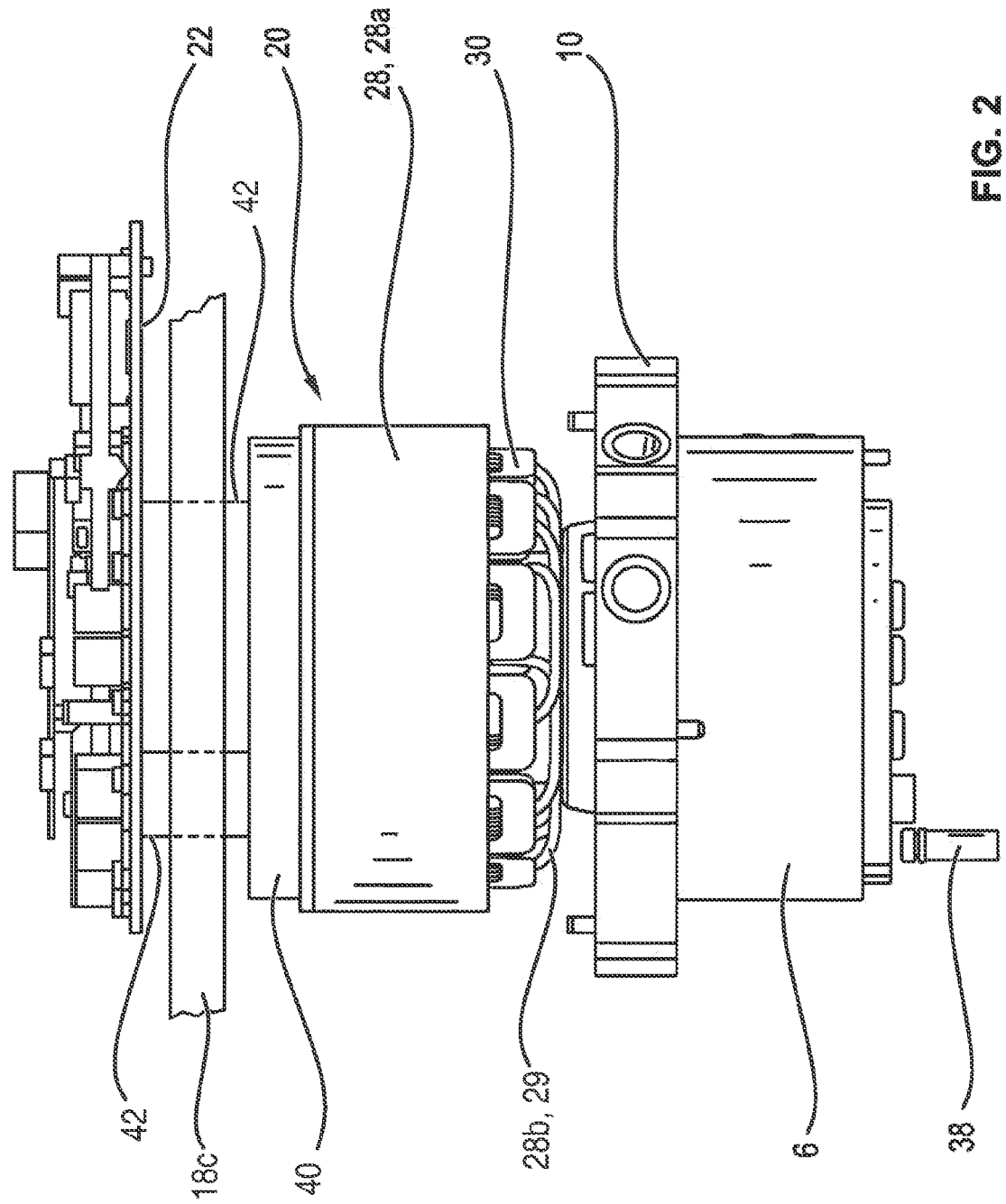
FIG. 2 shows a side view of the refrigerant compressor without a housing and with an indicated housing intermediate wall and bushings, provided therein, for phase connections of the electric motor or its stator or rotating-field winding.
Figure 3:
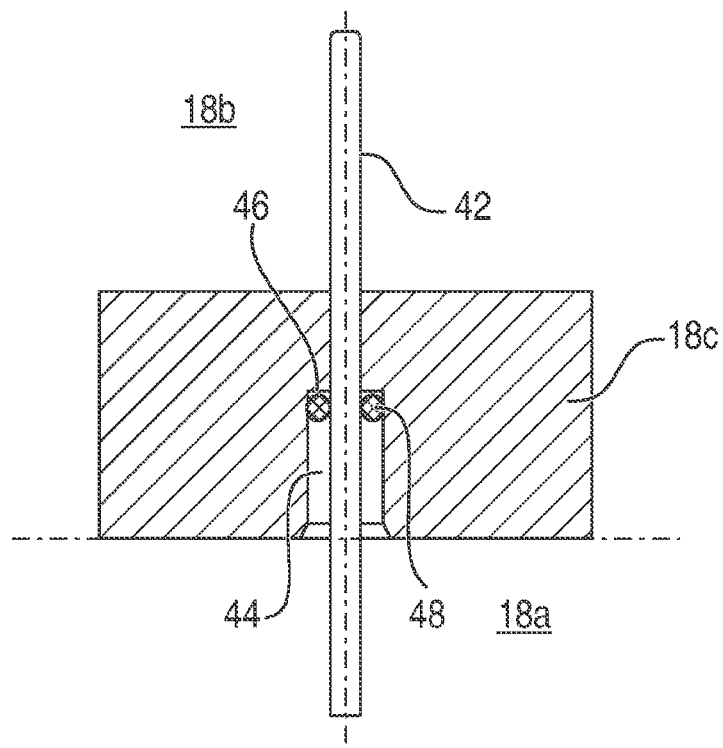
FIG. 3 shows a detail of a sectional illustration of the region of an individual passage opening in the housing intermediate wall between the motor housing and the electronics housing (motor compartment and, respectively, electronics compartment) having, according to a first variant, a first sealing ring pressure- and fluid-tight coil enameled wire as the phase connection of a stator winding (rotating-field winding of the electric motor)

According to FIG. 2, an electric motor 20 such as a brushless electric motor, includes a rotor, not illustrated in any detail, that is coupled in a rotationally fixed manner to a motor shaft and is arranged within a stator 28 such that it can rotate. The stator 28 may include a (stator) laminated core 28a with, for example, twelve inwardly directed stator teeth on which a stator or rotating-field winding 28b of the electric motor 20 comprising a number of coils (coil windings) 29 is mounted. The coils 29 of the individual motor phases of the stator winding are wound onto coil or winding bodies 30, provided with reference signs merely by way of example, which are in turn fitted onto the stator teeth.

The electronics housing 18b is closed by a housing cover (electronics cover) 32 on an end side, averted from the compressor 6, of the refrigerant drive 4. With the housing cover 32 open, the motor electronics 22 are mounted in the electronics housing 18b, and are furthermore accessible for servicing or repair purposes with a housing cover 32 removed.

The drive housing 18 has, in the region of the electronics housing 18b, a housing connection section 34 for electrically contact-connecting the electronics 22 to an on-board electrical system of the motor vehicle. The housing connection section 34 may include two motor connections 34a and 34b which are guided to the electronics 22 and electrically contact-connected to the electronics within the electronics housing 18b.

The drive housing 18 has a (refrigerant) inlet 36 for connection to the refrigerant circuit. A refrigerant of the refrigerant circuit flows into the drive housing 18, such as into the motor housing 18a, via the inlet 36. The refrigerant flows out of the motor housing 18a, through the end plate 10, to the compressor 6 which is configured, such as, as a scroll compressor. The refrigerant is subsequently compressed by means of the compressor 6 and exits at a base-side (refrigerant) outlet 38 of the compressor 6 into the refrigerant circuit of the air-conditioning system.

The outlet 38 is integrally formed on the base of a pot-like compressor housing 40 of the compressor 6. Here, in the connected state, the inlet 36 forms the low-pressure side or the suction side, and the outlet 38 forms the high-pressure side or the pump side of the refrigerant compressor 2.

The coils 29 are wound onto the winding former 30 and, together with the winding former, are fitted onto the stator teeth of the laminated core 28a. Here, each of the frame-like winding formers 30 is fitted with one of the coils (coil winding) 29 or a coil pair as part of the stator winding 28b. The coils 29 can be connected, for example, to form a six-phase (6-phase) motor or rotating-field winding 28b, at least partially by means of a connecting or connection ring 40, fitted on the end side of the stator 28, within the motor housing 18b, wherein, for example, three coil ends 41 then serve as phase connections 42. During electromotive operation, the energized coils 29 of the stator winding 28b generate the stator-side magnetic field which occurs in interaction with permanent magnets of the rotor, rotating about the central stator or motor axis A, of the brushless electric motor 20.

The coils (coil windings) of the stator winding 28b of the brushless electric motor 20 may already be connected in star within the connecting ring (connection ring) 40. In this case, three coil ends 41 of the coil windings, designed as enameled wire, are guided out of the motor housing (motor compartment) 18a, through the housing intermediate wall 18c, into the electronics housing (into the electronics compartment) 18b as, correspondingly, three phase connections 42 which are therefore designed as enameled wire. If the coils (coil windings) of the stator winding 28b are connected in the motor electronics, six coil ends 41 of the coil windings, designed as enameled wire, are guided out of the motor housing (motor compartment) 18a, through the housing intermediate wall 18c, into the electronics housing (into the electronics compartment) 18b as phase connections 42 which are correspondingly designed as enameled wire.

Such an enameled wire, which is connected, e.g. welded, in the or to the connecting ring (connection ring) 40 or to a switching unit arranged on the stator 28 can also be provided as the phase connection 42. This variant is advantageous when a portion of the connection or of the motor electronics is arranged at the or on the stator.

The enameled wires are guided as phase connections 42 through the housing intermediate wall 18c between the motor housing 18a and the electronics housing 18b in a pressure-tight and gas-tight and also electrically insulated manner via passage openings 44 in the housing intermediate wall 18c. The phase connections 42 are contact-connected to the electronics 22 in the electronics housing 18c.

For sealing off the respective enameled wire as the phase connection 42, a step 46 surrounding the passage opening 44 is made in the housing intermediate wall 18c, a first sealing ring 48 sitting in the step. The first sealing ring bears directly against the phase connection 42 on one side and directly against the inner wall or inner circumference of the passage opening 44 on the other side. As a result, a simple and reliable, fluid- and pressure-tight bushing of the respective phase connection 42 is already provided.

Figure 4:
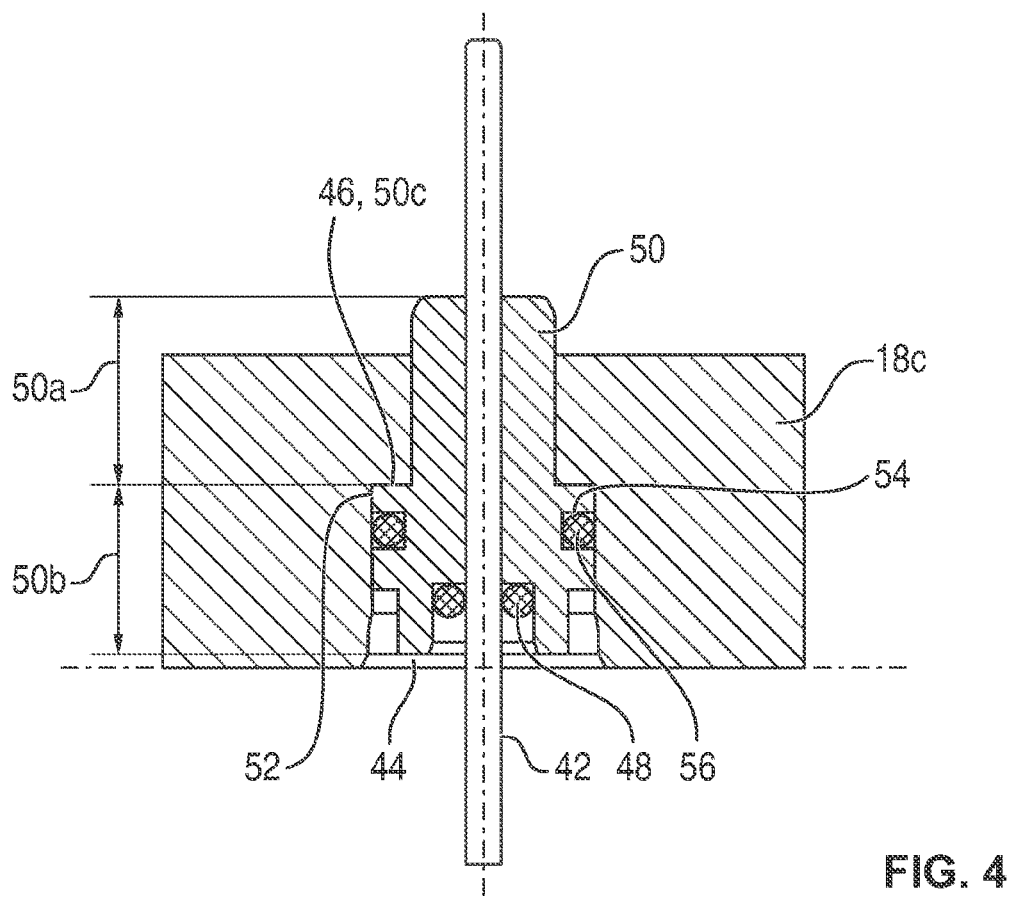
FIG. 4 shows, in an illustration according to FIG. 3, a second variant of the pressure- and fluid-tight bushing of the coil enameled wire as the phase connection with an additional sleeve and with a second sealing ring.
Figure 5:
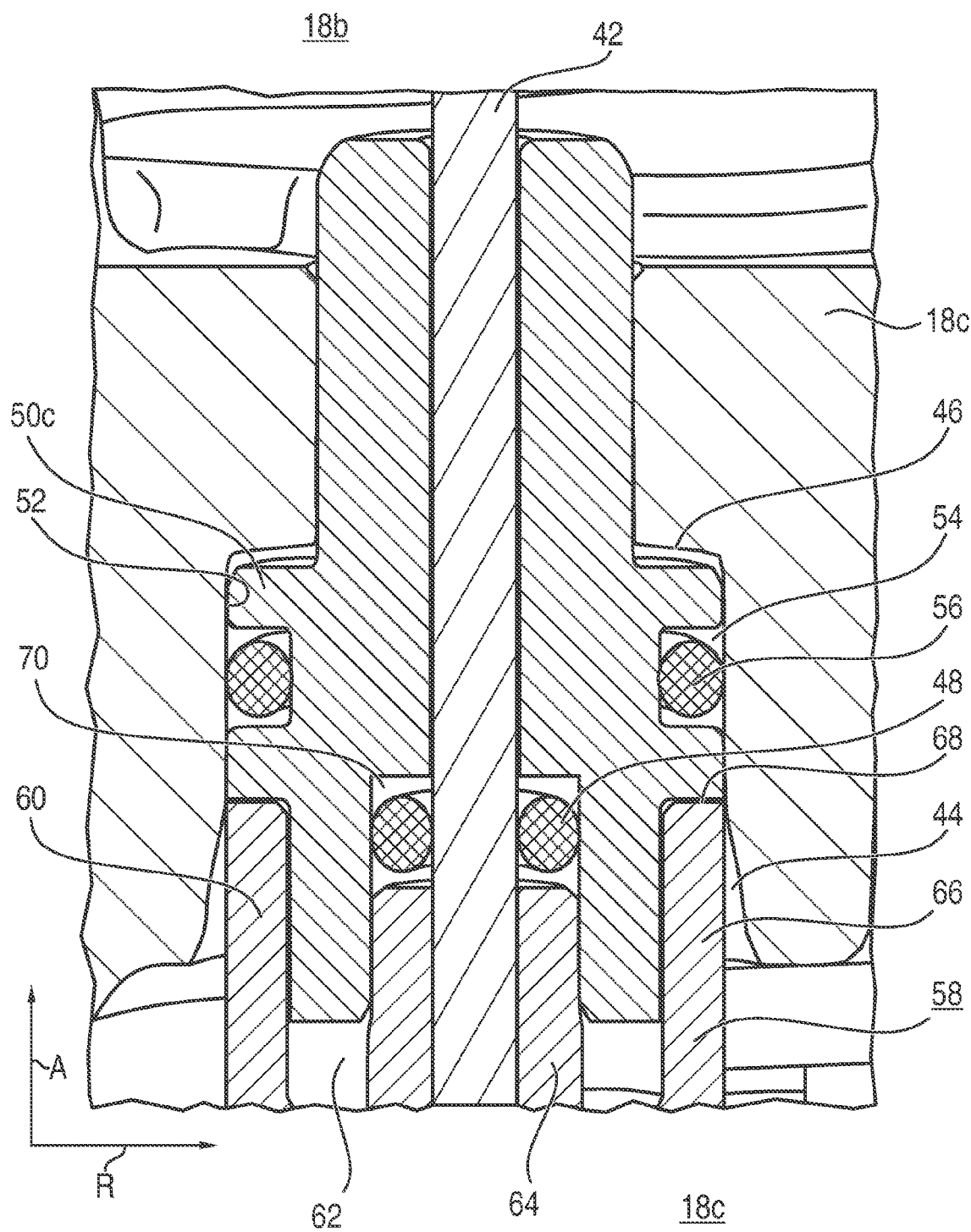
FIG. 5 shows, in an illustration according to FIG. 4, the second variant of the bushing with an additional pressing sleeve for producing an interference fit of the sleeve in the bushing.

In the embodiment according to FIGS. 4 and 5, a sleeve 50 is inserted into the passage opening 44, the respective enameled wire as phase connection 42 being guided, with the first sealing ring 48 bearing against the phase connection, via the sleeve. A (radial) annular groove 54 oriented in the radial direction R is made in the sleeve 50 at its outer circumference 52, a second sealing ring 56 bearing circumferentially against the passage opening 44, i.e. in turn against its inner wall (inner circumference), sitting in the annular groove.

The sleeve 50 has a first sleeve section 50a with a first outside diameter and a second sleeve section 50b with a widened, second outside diameter which is larger than the outside diameter of the first sleeve section 50b. An encircling supporting collar 50c, which bears against the step 46 surrounding the passage opening 44, is formed at the transition between the two sleeve sections 50a and 50b. The radial annular groove 54, in which the second sealing ring 56 is received, is made in the outer circumference of the widened second sleeve section 50b of the sleeve 50. Therefore, the sleeve 50 in the passage opening 44 is sealed off by means of the second sealing ring 56, while the first sealing ring 48 seals the respective phase connection 42 in a fluid- and pressure-tight manner within the sleeve 50.

The first sealing ring 48 and/or the second sealing ring 56 and the sleeve 50 can be designed as a two-component injection-molded part. In addition, the first sealing ring 56 and/or the second sealing ring 48 can be designed as an elastomeric seal in the form of an O-ring or as a solid seal in the form of an, for example metal, C-ring. PA6 or PA66 with HNBR may be suitable as a material pair of the sleeve 50 with the first sealing ring 46 and/or the second sealing ring 48.

In the embodiment according to FIG. 5, the bushing for the respective enameled wire as the phase connection 42 is designed as a cylindrical interference fit. To this end, the sleeve 50 in the passage opening 44 is pressed by means of a pressing sleeve 58. That sleeve section 50b of the sleeve 50 which faces the motor compartment 18a, that is to say faces away from the electronics compartment 18b, has a joining contour in the form of an encircling joining or annular collar 60 oriented in the axial direction A. The joining or annular collar engages into a joining contour of the pressing sleeve 58 in the form of an (axial) annular groove 62 running in the axial direction A, which annular groove is concentric with a central sleeve shaft 64 for guiding the phase connection 42 through. The axial annular groove 62 of the pressing sleeve 58 is delimited at the outer circumference by an annular collar 66. The annular collar is supported on a step 68 of the sleeve 50 on the outer circumference. The annular collar 66 projects beyond the central shaft 64 of the pressing sleeve 58 in the axial direction A so as to form a receiving space 70 for the first sealing ring 48.

In summary, the invention relates to an electrical refrigerant drive 4, comprising a motor housing 18a which accommodates an electric motor 20 and a fluid-tight housing intermediate wall 18c so as to form an electronics housing 18b accommodating motor electronics 22, wherein at least one passage opening 44 is made in the housing intermediate wall 18c, via which passage opening a phase connection 42 of a stator winding 28b of the electric motor 20 is guided in a fluid-tight and pressure-tight manner into the electronics housing 18b for making contact with the motor electronics 22, wherein a step 46 surrounding the passage opening 44 is made in the housing intermediate wall 18c, and wherein a first sealing ring 48, which bears directly against the phase connection 42, which may be an enameled wire coil end 41 of the stator winding 28b of the electric motor 20, sits in the passage opening 44.

The invention is not restricted to the exemplary embodiments described above. Rather, other variants of the invention can also be derived therefrom by a person skilled in the art without departing from the subject matter of the invention. In particular, all individual features described in connection with the exemplary embodiments may further also be combined with one another in a different manner without departing from the subject matter of the invention.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE SIGNS

2 Refrigerant compressor
4 Refrigerant drive/module
6 Compressor/module
8 Interface
10 End plate 12 Flange connection
12a, 12b, 12c Flange
14 Screw receptacle
16 Fastening screw
18 Drive housing
18a Housing subregion/motor housing
18b Housing subregion/electronics housing
18c Housing intermediate wall
20 Electric motor
22 Motor electronics
24 Motor shaft
26 Rotor
28 Stator
28a Stator laminated core
28b Stator winding/rotating-field winding
29 Coil/coil winding
30 Coil body/winding body
32 Housing cover
34 Housing connection section
34a, 34b Motor connection
36 Inlet
38 Outlet
40 Connecting/connection ring
41 Coil end
42 Phase connection/enameled wire
44 Passage opening
46 Step
48 First sealing ring
50 Sleeve
50a First sleeve section
50b Second sleeve section
50c Supporting collar
52 Outer circumference
54 Radial annular groove
56 Second sealing ring
58 Pressing sleeve
60 Joining/annular collar
62 Axial annular groove
64 Sleeve shaft
66 Annular collar
68 Step
70 Receiving space
Axial direction
R Radial direction While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. An electrical refrigerant drive for use in an air-conditioning system of a motor vehicle, the electrical refrigerant drive comprising:
an electric motor configured to be coupled to a compressor and including a stator winding;
a motor housing receiving the electric motor and including a fluid-tight housing intermediate wall forming an electronics housing configured to house motor electronics, and forming a passage opening, wherein the housing intermediate wall includes a step disposed in the passage opening;
a phase connection of the stator winding guided by the passage opening in a fluid-tight and pressure-tight manner into the electronics housing and configured to contact the motor electronics;
a first sealing ring disposed in the passage opening, wherein the first sealing ring bears directly against the phase connection;
a sleeve seated in the passage opening, wherein the sleeve guides the phase connection and the first sealing ring; and
a second sealing ring, wherein an outer circumference of the sleeve defines a radial annular groove, wherein the second sealing ring is disposed in the radial annular groove and bears circumferentially against the passage opening,
wherein the sleeve includes a first sleeve section, a second sleeve section, and a circumferential supporting collar adjoining the first sleeve section to the second sleeve section, wherein the second sleeve section is wider than the first sleeve section and the circumferential supporting collar bears against the step.

2. The electrical refrigerant drive of claim 1, wherein the phase connection is formed by an enameled wire.

3. The electrical refrigerant drive of claim 1, wherein the phase connection is a coil end of the stator winding.

4. The electrical refrigerant drive of claim 1, the first sealing ring surrounds the passage opening and bears circumferentially against the passage opening.

5. The electrical refrigerant drive of claim 1, wherein the second sleeve section forms the radial annular groove.

6. The electrical refrigerant drive of claim 1, wherein the first sealing ring and/or the second sealing ring are/is connected in a materially bonded manner to the sleeve.

7. The electrical refrigerant drive of claim 6, wherein the first sealing ring and/or the second sealing ring form an elastomeric seal.

8. The electrical refrigerant drive of claim 1, further comprising:
a pressing sleeve, wherein the pressing sleeve presses the sleeve in the passage opening.

9. The electrical refrigerant drive of claim 8, wherein the pressing sleeve includes a central sleeve shaft and the sleeve includes a joining contour formed by a first annular collar, wherein the first annular collar engages an axial annular groove surrounding the central sleeve shaft.

10. The electrical refrigerant drive of claim 6, wherein the first sealing ring and/or the second sealing ring and the sleeve are connected to one another by injection molding.

11. The electrical refrigerant drive of claim 10, wherein the first sealing ring and/or the second sealing ring and the sleeve are connected to one another by a two-component injection molding process.

12. The electrical refrigerant drive of claim 6, wherein the first sealing ring and/or the second sealing ring is/are an O-ring.

13. The electrical refrigerant drive of claim 6, wherein at least one of the first sealing ring and the second sealing ring is a metal C-ring.

14. The electrical refrigerant drive of claim 6, wherein the first sealing ring and/or the second sealing ring and the sleeve are formed by at least two materials including HNBR and PA6 or PA66.

15. The electrical refrigerant drive of claim 9, wherein an outer circumference of the axial annular groove of the pressing sleeve is delimited by a second annular collar supported by an outer circumferential step of the sleeve, wherein the second annular collar extends axially beyond the central sleeve shaft to form a receiving space configured to receive the first sealing ring.

16. An electrical refrigerant drive comprising:
a compressor;
an electric motor operatively coupled to the compressor and including a stator provided with a stator winding;
a housing housing the electric motor and including an intermediate wall forming an electronic housing, configured to house motor electronics, and a counterbore forming a passage opening and including a first portion, a second portion, and a step disposed there between;
a sleeve disposed in the passage opening, the sleeve includes an end, forming a receiving space, and a radial groove;
a phase connection of the stator winding extending through the sleeve to the electronic housing;
a first sealing ring disposed in the receiving space and circumferentially surrounding the phase connection; and
a second sealing ring disposed in the radial groove, wherein at least one of the first sealing ring and the second sealing ring are connected in a materially bonded manner to the sleeve, and wherein at least one of the first sealing ring and the second sealing ring is a metal C-ring.

17. An electrical refrigerant drive comprising:
a compressor;
an electric motor operatively coupled to the compressor and including a stator provided with a stator winding;
a housing housing the electric motor and including an intermediate wall forming an electronic housing, configured to house motor electronics, and a passage opening;
a sleeve disposed in the passage opening and forming a receiving space and a radial groove;
a first sealing ring disposed in the receiving space and configured to form a seal impervious to liquid and gas;
a second sealing ring disposed in the radial groove;
a phase connection of the stator winding extending through the sleeve and the sealing ring to the electronic housing; and
a pressing sleeve, wherein the pressing sleeve presses the sleeve in the passage opening and includes a central sleeve shaft and the sleeve includes a joining contour formed by a first annular collar, wherein the first annular collar engages an axial annular groove surrounding the central sleeve shaft, and
wherein an outer circumference of the axial annular groove of the pressing sleeve is delimited by a second annular collar supported by an outer circumferential step of the sleeve, wherein the second annular collar extends axially beyond the central sleeve shaft to form a receiving space configured to receive the first sealing ring.

* * * * *